United States Patent
Ma et al.

(10) Patent No.: US 12,278,697 B2
(45) Date of Patent: Apr. 15, 2025

(54) SYSTEM AND METHOD FOR MULTIMACHINE PHASE SYNCHRONIZATION BASED ON OPTICAL FIBER TRANSMISSION

(71) Applicant: ILD ELECTRONIC CO., LTD., Jiangsu (CN)

(72) Inventors: Haibo Ma, Jiangsu (CN); Shunlung Chang, Jiangsu (CN)

(73) Assignee: ILD ELECTRONIC CO., LTD., Jiangsu (CN)

( * ) Notice: Subject to any disclaimer, the term of this patent is extended or adjusted under 35 U.S.C. 154(b) by 0 days.

(21) Appl. No.: 18/037,086

(22) PCT Filed: Sep. 1, 2022

(86) PCT No.: PCT/CN2022/116424
§ 371 (c)(1),
(2) Date: May 16, 2023

(87) PCT Pub. No.: WO2024/007439
PCT Pub. Date: Jan. 11, 2024

(65) Prior Publication Data
US 2024/0348359 A1    Oct. 17, 2024

(30) Foreign Application Priority Data
Jul. 7, 2022 (CN) .......................... 202210792612.3

(51) Int. Cl.
*H04J 3/06*    (2006.01)
(52) U.S. Cl.
CPC .......... *H04J 3/0697* (2013.01); *H04J 3/0667* (2013.01)

(58) Field of Classification Search
None
See application file for complete search history.

(56) References Cited

U.S. PATENT DOCUMENTS

2006/0245454 A1* 11/2006 Balasubramanian . H04J 3/0673
375/356

FOREIGN PATENT DOCUMENTS

| CN | 2297713 | 8/2001 |
|----|---------|--------|
| CN | 103368803 | 10/2013 |

OTHER PUBLICATIONS

Wang et al., "Synchronization control strategy of pulse power based on Manchester coding", Dec. 2015, Journal of Naval University of Engineering, vol. 27, Nr:6, pp. 11-15 (Year: 2015).*

(Continued)

*Primary Examiner* — David W Lambert
(74) *Attorney, Agent, or Firm* — JCIPRNET (57) ABSTRACT

A system and a method for multimachine phase synchronization based on optical fiber transmission are provided. The system includes a master and a plurality of slaves, where an optical fiber transmitting interface of the master is connected to an optical fiber receiving interface of one slave, the slave connected to the master is connected in series with the other slaves in turn, the master transmits phase information of a digital reference source thereof as a system synchronous phase signal to the slave connected to the master, the slave takes the received system synchronous phase signal as a phase of the local digital reference source, and transmits the system synchronous phase signal to a slave connected to an optical fiber transmitting interface of the slave through the optical fiber transmitting interface, and when the last slave is connected to the master, the master and the slaves form a closed-loop communication test.

12 Claims, 6 Drawing Sheets

(56) References Cited

OTHER PUBLICATIONS

Wang Yi et al. "Synchronization control strategy of pulse power based on Manchester coding", Journal of Naval Engineering University, Dec. 2015, submit with English abstract, pp. 1-5.

"International Search Report (Form PCT/ISA/210) of PCT/CN2022/116424," mailed on Nov. 30, 2022, pp. 1-4.

"Written Opinion of the International Searching Authority (Form PCT/ISA/237) of PCT/CN2022/116424," mailed on Nov. 30, 2022, pp. 1-3.

* cited by examiner

SYSTEM AND METHOD FOR MULTIMACHINE PHASE SYNCHRONIZATION BASED ON OPTICAL FIBER TRANSMISSION

CROSS-REFERENCE TO RELATED APPLICATION

This application is a 371 of international application of PCT application serial no. PCT/CN2022/116424, filed on Sep. 1, 2022, which claims the priority benefit of China application no. 202210792612.3, filed on Jul. 7, 2022. The entirety of each of the above mentioned patent applications is hereby incorporated by reference herein and made a part of this specification.

TECHNICAL FIELD

The present invention relates to the technical field of multimachine systems, and particularly relates to a system and method for multimachine phase synchronization based on optical fiber transmission.

RELATED ART

Multimachine phase synchronization is widely used in power supply systems. In a multiphase system, on the basis of synchronizing the phases of a slave and a master, a phase difference between the slave and the master is implemented; and similarly, in a multimachine power supply apparatus, after phase synchronization, a 180-degree phase difference is added for phase reversal and then series connection is performed to achieve voltage rise. The real time capability and accuracy of multimachine phase synchronization are two key points in applications. At present, phase synchronization in multimachine systems is mainly implemented in two ways. One way is transmission of a zero-crossing signal, where a master transmits a synchronization zero-crossing signal to a slave, and then the slave receives the synchronization zero-crossing signal, and carries out synchronization in phase with the master at a zero-phase point. This method is strong in real time capability but not high in accuracy, synchronization is performed once per cycle, and especially when frequency changes occur, phase changes cannot be accurately tracked, and phase jump will be produced. The other way is the use of reference source phase-lock technique, where an analog reference source of a master is sent to a slave, and then the slave carries out frequency discrimination and phase locking on the analog reference source of the master to obtain phase information. This method is high in accuracy, and phase changes can be tracked, but implementation circuits are complicated, and the real time capability cannot meet the requirements, with a certain delay effect.

SUMMARY OF INVENTION

Technical Problem

An objective of the present invention is: in order to overcome the deficiencies in the prior art, provide a system and method for multimachine phase synchronization based on optical fiber transmission. The system and method of the present invention enables real time transmission of synchronous phase code values in high-rate optical fiber communication, so that the accuracy is high, and phase changes can be tracked in real time, thus having good synchronization performance and good expansibility in a multimachine power supply system.

Solution to Problem

The present invention discloses a system for multimachine phase synchronization based on optical fiber transmission, including a master and a plurality of slaves, each of the master and the slaves being provided with an optical fiber transmitting interface and an optical fiber receiving interface, where the optical fiber transmitting interface of the master is connected to the optical fiber receiving interface of one slave by means of an optical fiber, the slave connected to the master is connected in series with the other slaves in turn, the optical fiber receiving interface of the slave is connected to the optical fiber transmitting interface of the previous slave connected thereto by means of an optical fiber, and the optical fiber transmitting interface of the slave is connected to the optical fiber receiving interface of the next slave connected thereto by means of an optical fiber; the master generates a new local digital reference source at an interval of time T, and transmits phase information of the digital reference source thereof as a system synchronous phase signal to the slave connected to the master by means of an optical fiber, the optical fiber receiving interface of the slave receives the system synchronous phase signal, takes the received system synchronous phase signal as a phase of the local digital reference source, and transmits the system synchronous phase signal to the optical fiber receiving interface of a slave connected to the optical fiber transmitting interface of the slave through the optical fiber transmitting interface; and when the optical fiber transmitting interface of the last slave is connected to the optical fiber receiving interface of the master, the master and the slaves form a closed-loop communication test, and the test includes a self-test mode and a self-calibration mode.

Further, the master, when generating the local digital reference source, encodes the phase information of the digital reference source to generate a synchronous phase code value as the system synchronous phase signal.

Further, a duration of information transmission of the optical fiber is $T_{optical\ fiber}$, $T_{optical\ fiber}$ is $\ll T$, and T is a processing cycle of the digital reference source of the master.

Further, when the system enters the self-test mode, and if a time tr of receiving, by the master, the system synchronous phase signal returned by the last slave is less than T, the self-test determines that the real-time transmission is successful; and if tr is greater than T, the self-test determines that the real-time transmission fails, where T is a processing cycle of the digital reference source of the master.

Further, when the system enters the self-calibration mode, the master acquires a set value of information bits of a current synchronous phase signal, and the system enters the self-test mode, and if the self-test determines that the real-time transmission is successful, the calibration is completed, when the self-test determines that the real-time transmission fails, the system adjusts the information bits of the system synchronous phase signal, and enters the self-calibration mode again until the self-test determines that the real-time transmission is successful.

Further, when the information bits of the system synchronous phase signal are the minimum accuracy, the self-calibration fails when the self-test determines that the real-time transmission has failed.

The present invention discloses a method for multimachine phase synchronization based on optical fiber transmission, which is based on the system for multimachine phase synchronization based on optical fiber transmission, the method including the following steps:

step 1: generating, by a master, a new local digital reference source at an interval of time T, and encoding phase information of the digital reference source to generate a synchronous phase code value, namely, a system synchronous phase signal;

step 2: transmitting, by the master, the system synchronous phase signal to an optical fiber receiving interface of a slave connected to the master through an optical fiber transmitting interface by means of an optical fiber;

step 3: taking, by the slave connected to the master, the received system synchronous phase signal as a phase of the local digital reference source, and transmitting the system synchronous phase signal to an optical fiber receiving interface of a slave connected to the optical fiber transmitting interface of the slave by means of an optical fiber;

step 4: taking, by the slave receiving the system synchronous phase signal from the optical fiber transmitting interface of the slave, the received system synchronous phase signal as a phase of the local digital reference source, and transmitting the system synchronous phase signal to an optical fiber receiving interface of a next slave connected to the optical fiber transmitting interface of the slave by means of an optical fiber; and step 5: repeating step 4 until all the slaves receive the system synchronous phase signal and take the system synchronous phase signal as a phase of the local digital reference source, so as to achieve multimachine phase synchronization.

Further, a duration of information transmission of the optical fiber is $T_{optical\ fiber}$, $T_{optical\ fiber} \ll T$, and when there are N devices, the master transmits the system synchronous phase signal at time t1, the N-th slave receives the system synchronous phase signal at time tn, tn−t1<T, and when the N-th slave receives a first frame of the system synchronous phase signal of the master, a second frame of the system synchronous phase signal of the master has not been generated.

Further, a duration required for transmission of one frame of the system synchronous phase signal by means of the optical fiber is Δt, and when the N-th slave receives the first frame of the system synchronous phase signal of the master, N*Δt<T needs to be satisfied; at the same optical fiber rate, the larger the number of bits of the synchronous phase code value transmitted by the optical fiber is, the higher the phase accuracy is, and the longer the transmission duration Δt is; and when Δt becomes longer with the number of bits of the synchronous phase code value, N<T/Δt, the number N of the devices is smaller.

Further, when the master and the slaves form a closed-loop communication test, the system enters a self-test mode first, and if a time tr of receiving, by the master, the system synchronous phase signal returned by the last slave is less than T, the self-test determines that the real-time transmission is successful, and if tr is greater than T, the self-test determines that the real-time transmission fails, and the system enters a self-calibration mode.

Further, when the system enters the self-calibration mode, the master acquires a set value of information bits of a current synchronous phase signal and a minimum set bits of accuracy, and the system enters the self-test mode, when the self-test determines that the real-time transmission is successful, the calibration is completed, when the self-test determines that the real-time transmission fails, the system adjusts the information bits of the system synchronous phase signal, and enters the self-calibration mode again until the self-test determines that the real-time transmission is successful.

Further, when the information bits of the system synchronous phase signal are the minimum set bits of accuracy, the self-calibration fails when the self-test determines that the real-time transmission has failed.

Effects of Invention

The present invention realizes the multimachine phase synchronization function based on a high-rate optical fiber communication link. The master, when generating the local digital reference source, encodes the phase information of the source to generate a synchronous phase code value, and transmits the synchronous phase code value by means of an optical fiber. The slave obtains the synchronous phase code value from the optical fiber and takes the synchronous phase code value as phase information of the local digital reference source, so that the local machine and the master operate at the same phase; and at the same time, the slave transmits the synchronous phase information to the next slave again, so that the digital reference sources of all the devices operate at the same phase, thereby completing phase synchronization. The number of bits of the synchronous phase information transmitted in the system can be adjusted according to the needs of the system. If the number of bits is large, the synchronous phase accuracy is high, the number of multiple machines in the system is small; and if the number of bits is small, the synchronous phase accuracy is reduced, and the number of multiple machines in the system may be increased. The present invention enables real time transmission of synchronous phase code values in high-rate optical fiber communication, so that the accuracy is high, and phase changes can be tracked in real time, thus having good synchronization performance and good expansibility in a multimachine power supply system.

The present invention also provides a self-test mode of the multimachine system to detect whether the system meets real-time synchronous phase transmission; and provides a self-calibration mode of the multimachine system to simultaneously meet the real-time synchronous phase transmission and the minimum accuracy of the phase information set by the system so as to obtain an optimal number of bits of the synchronous phase information, such that the multimachine system achieves the synchronization function in real time and accurately.

DESCRIPTION OF EMBODIMENTS

An embodiment of the present invention will be described in detail below. The embodiment is implemented on the premise of the technical solution of the present invention, and a detailed implementation and a specific operation process are given. However, the scope of protection of the present invention is not limited to the following embodiment.

Figure 1:
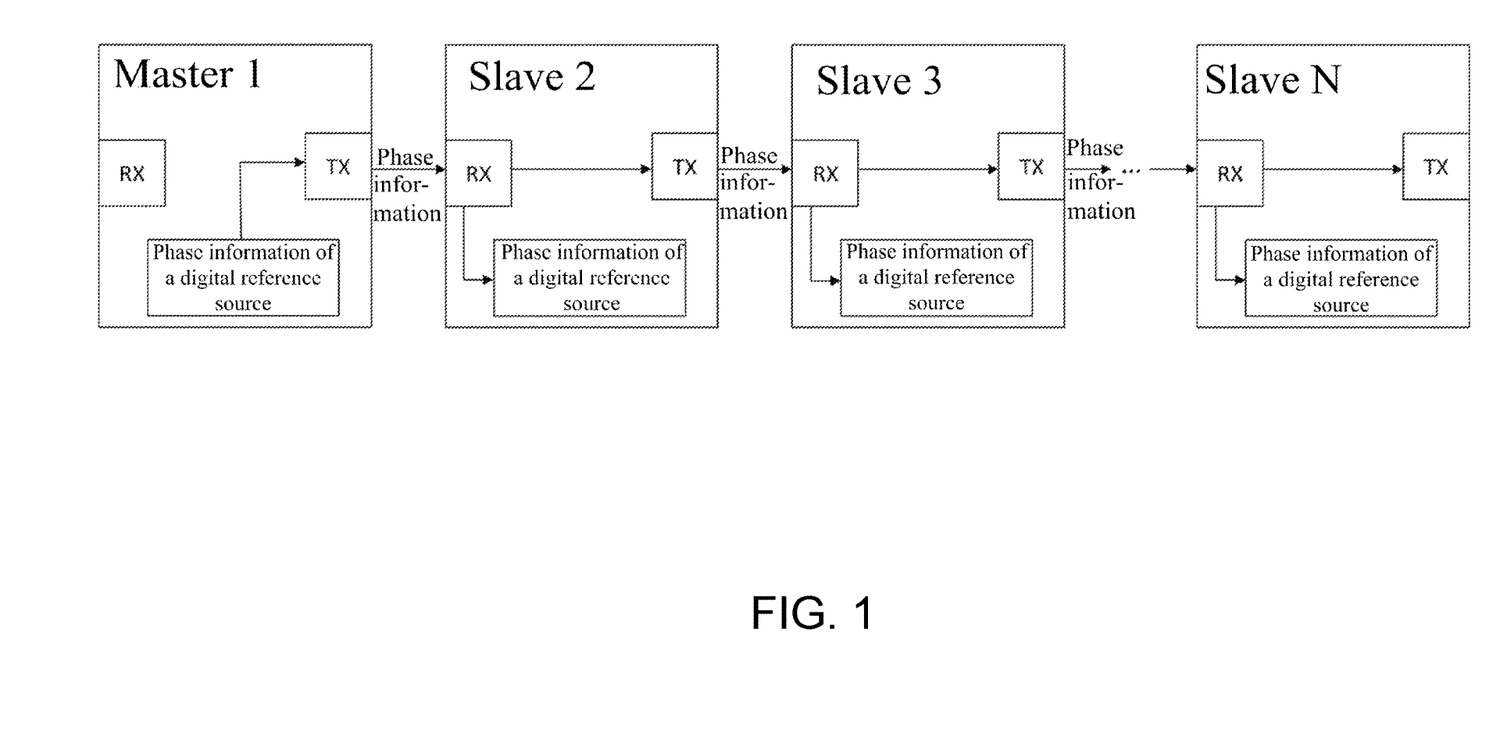
FIG. 1 is a structural schematic diagram of the system according to the present invention.

The present invention discloses a system for multimachine phase synchronization based on optical fiber transmission, as shown in FIG. 1, including a plurality of (at least two) devices to form a multimachine system, each of the devices having an optical fiber transmitting interface (TX) and an optical fiber receiving interface (RX), where the receiving interface of the N−1-th device is connected to the transmitting interface of the N−2-th device, and the transmitting interface of the N−1-th device is connected to the receiving interface of the N-th device, where N is the number of the devices. One device in the system is a master, and the others are slaves, namely, Master 1, Slave 2, Slave 3 . . . and Slave N, where the optical fiber transmitting interface of Master 1 is connected to the optical fiber receiving interface of Slave 2 by means of an optical fiber, the optical fiber transmitting interface of Slave 2 is connected to the optical fiber receiving interface of Slave 3 by means of an optical fiber, and so on, until the transmitting interface of the N-th device is connected to the optical fiber receiving interface of Slave N−1 by means of an optical fiber. Master 1 takes phase information of a digital reference source thereof as a system synchronous phase signal, and transmits the synchronous phase signal to Slave 2 by means of an optical fiber, Slave 2 receives the system synchronous phase signal from the optical fiber, and on the one hand, takes the system synchronous phase signal as a phase of the local digital reference source to be synchronized with the master in real time, and on the other hand, transmits the system synchronous phase signal to Slave 3, and so on, until all the slaves receive the phase information sent by the master, and synchronize the local digital reference source with the received phase information, so as to achieve multimachine phase synchronization.

Master 1, when generating the local digital reference source, encodes the phase information of the source to generate a synchronous phase code value, and transmits the synchronous phase code value through optical fiber communication. The number of synchronous phase information code values affects the phase accuracy, and the number of bits should be selected according to the requirements of the system and hardware requirements. In this design, the synchronous phase uses a 30-bit code value, and the phase accuracy reaches 0.00000033 degrees.

Figure 2:
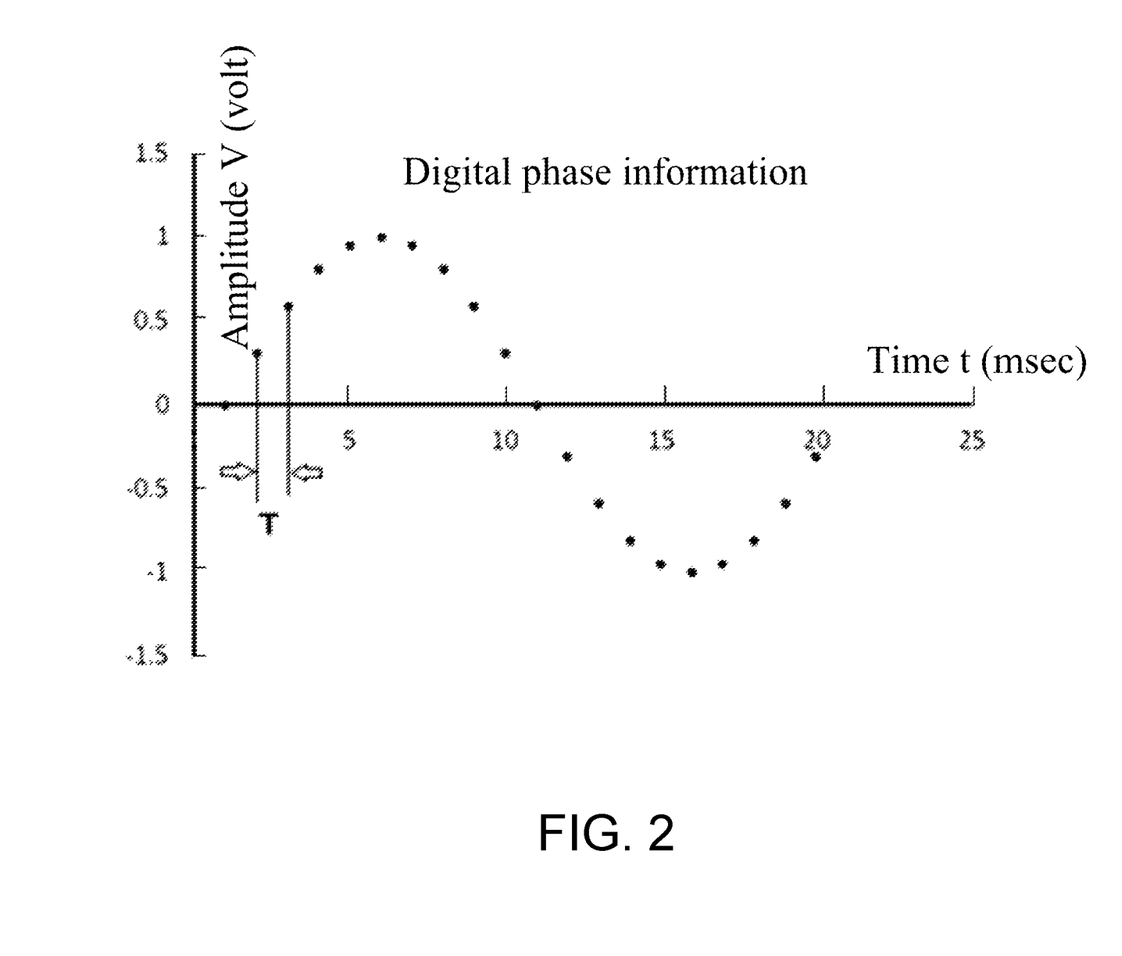
FIG. 2 is a schematic diagram of phase generation of a digital reference source.

As shown in FIG. 2, the processing cycle of the digital reference source of the master is T, that is, the master generates one new phase information at an interval of time T. An AC source signal in a power supply system is mostly at a few K rate, a frequency corresponding to the phase generation cycle T is a few M rate, and the optical fiber transmission can reach Gbps, that is, the duration $T_{optical\ fiber}$ of information transmission of the optical fiber is $\ll T$.

Figure 3:
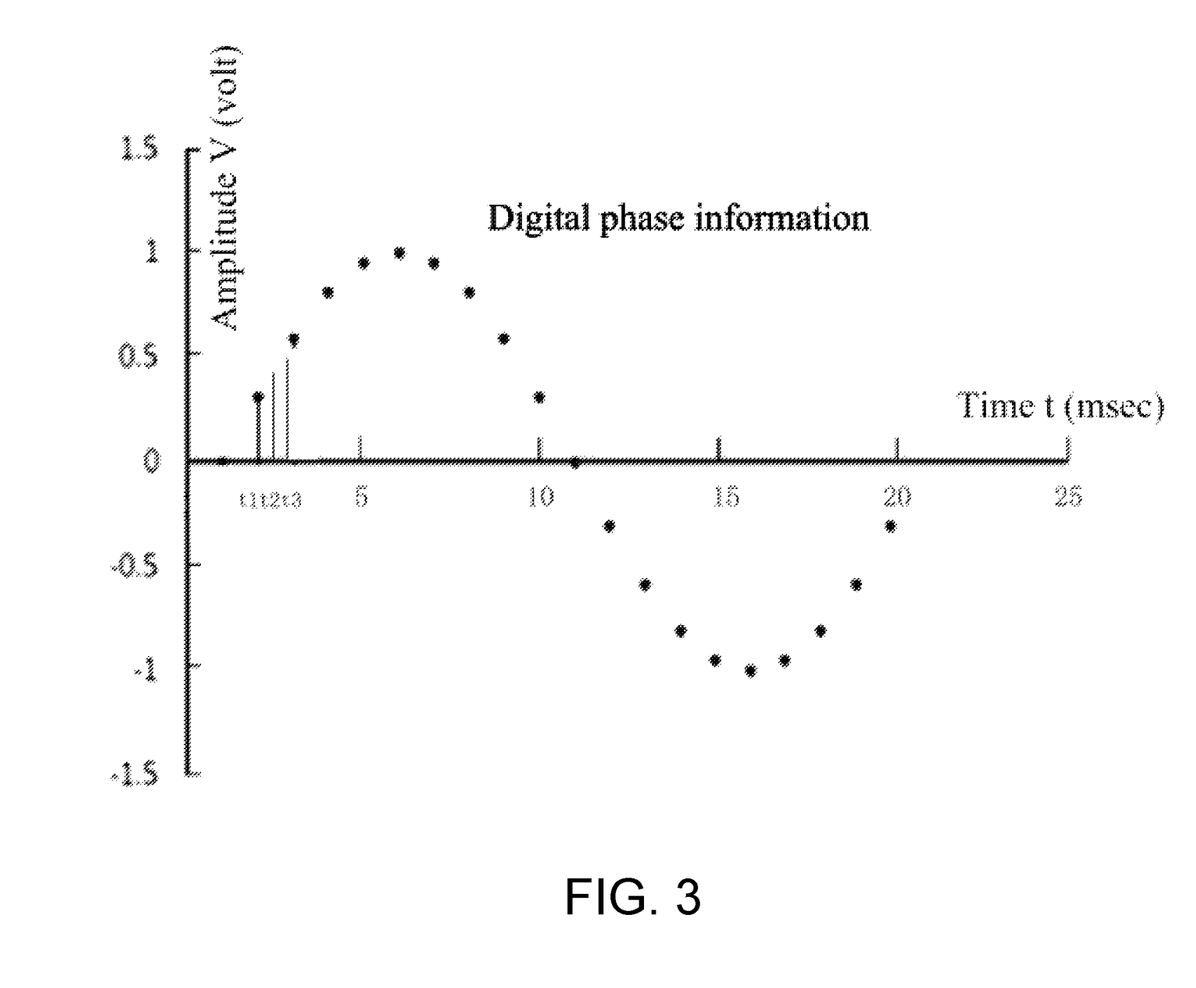
FIG. 3 is a schematic diagram of time points of phase receiving and transmitting by optical fibers in a multimachine system.

When the last slave receives a first frame of the system synchronous phase signal of the master, a second frame of the system synchronous phase signal of the master has not been generated. At this time, the digital reference sources of all the devices in the system operate at the same phase, and the multimachine system completes phase synchronization. As shown in FIG. 3, in the system, a duration required for transmission of one frame of the system synchronous phase signal by means of the optical fiber is Δt, at the same optical fiber rate, the larger the number of bits of the synchronous phase code value transmitted by the optical fiber is, the higher the phase accuracy is, and the longer the transmission duration Δt is.

$$N*\Delta t < T$$

$$N < T/\Delta t$$

When Δt becomes longer with the number of bits of the system synchronous phase signal, N will get smaller.

Figure 4:
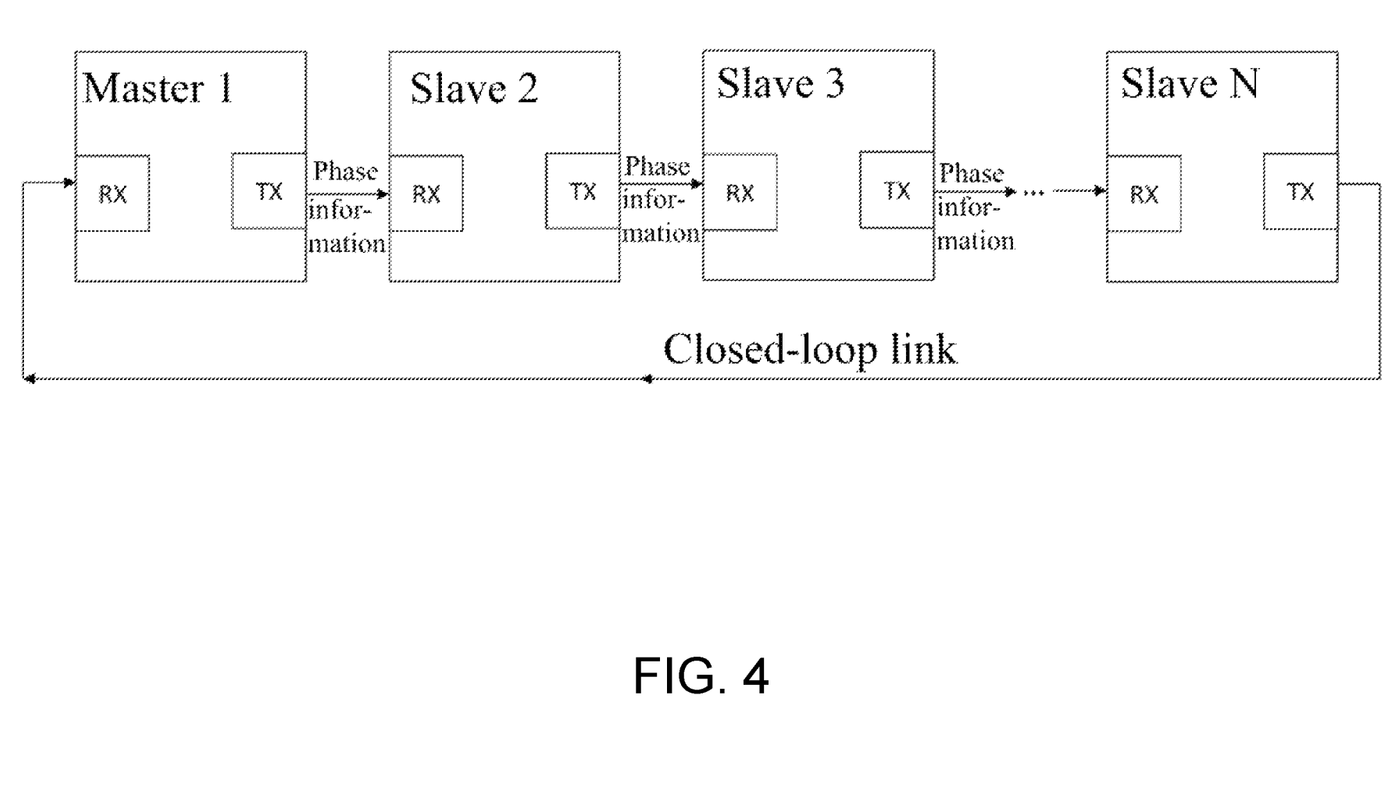
FIG. 4 is a structural schematic diagram of a closed-loop communication test of the system according to the present invention.

As shown in FIG. 4, the system also includes a test mode in which the optical fiber transmitting interface of the last slave is connected to the optical fiber receiving interface of the master to form a closed-loop communication test, that is, the last Slave N is connected to Master 1 in an end-to-end manner to form a closed-loop communication test. The system will automatically detect whether a current multimachine system meets a real-time synchronous phase; if not, a self-calibration mode can automatically adjust the phase to an optimal setting of the real-time synchronous phase. After the calibration is completed, such connection can be disconnected, and the system enters a normal mode.

Specifically, the test mode includes a self-test mode and a self-calibration mode. The self-test mode is that the multimachine system automatically detects the real-time synchronous phase. As shown in FIG. 4, the multimachine system enters the self-test mode. Master 1 receives phase information returned by Slave N, where the phase information is the system synchronous phase signal sent out by Master 1 at time t1 and returned to Master 1 at time t1+tr over a closed-loop optical fiber communication link. Here, tr is a duration of one closed-loop fiber transmission of the multimachine system, $$tr = N*\Delta t$$

Master 1 generates a new system synchronous phase signal at an interval of time T, and if tr<T, the self-test determines that the real-time transmission is successful; similarly, if tr>T, the self-test determines that the real-time transmission fails.

When the self-test fails, Master 1 can enter the self-calibration mode. In the self-calibration mode, users need to set a minimum number of bits of the synchronous phase information, namely, the minimum accuracy of the synchronous phase information that the multimachine system can accept. In the self-calibration mode, the duration Δt required for transmission of one frame of information by means of an optical fiber is shortened by adjusting the number of bits of the synchronous phase information, and thus the purpose of shortening the duration tr of one closed-loop fiber transmission in the multimachine system is achieved. The number of bits of the synchronous phase information will be gradually reduced during calibration, the self-test will be repeated for the reduction of each bit, and once the self-test is successful, the calibration is completed. If the test is not successful, the reduction of one bit will continue, the process is repeated until the self-test is successful, and at this moment, the self-calibration is completed, and the optimal number of bits of the synchronous phase information is given. When the number of bits of the synchronous phase information is the minimum number of bits of accuracy set by users, and the self-test is still not successful, the self-calibration fails.

Based on the above-mentioned system, the present invention further discloses a method for multimachine phase synchronization based on optical fiber transmission, which includes the following steps:

step 1: Master 1 generates a new local digital reference source at an interval of time T, and encodes phase information of the digital reference source to generate a synchronous phase code value, namely, a system synchronous phase signal;

step 2: Master 1 transmits the system synchronous phase signal to an optical fiber receiving interface of Slave 2 through an optical fiber transmitting interface by means of an optical fiber, where the transmitting time is t1;

step 3: Slave 2 takes the received system synchronous phase signal as a phase of the local digital reference source, and transmits the system synchronous phase signal to an optical fiber receiving interface of Slave 3 by means of an optical fiber, where the time of receiving the phase information by Slave 2 is t2;

step 4: Slave 3 takes the received system synchronous phase signal as a phase of the local digital reference source, and transmits the system synchronous phase signal to an optical fiber receiving interface of a next slave by means of an optical fiber, where the time of receiving the phase information by Slave 3 is t3; and step 5: step 4 is repeated until all the slaves receive the system synchronous phase signal, that is, Slave N receives the system synchronous phase signal, and takes the system synchronous phase signal as a phase of the local digital reference source, where the time of receiving the phase information by Slave N is tn. When Slave N receives a first frame of the phase information of Master 1, a second frame of the phase information of Master 1 has not been generated, that is, tn−t1<T is satisfied. At this time, the digital reference sources of all the devices in the multimachine system operate at the same phase, and the multimachine system completes phase synchronization.

As shown in FIG. 3, $\Delta t = t2 - t1$. At the same optical fiber rate, the larger the number of bits of the synchronous phase code value transmitted by the optical fiber is, the higher the phase accuracy is, and the longer the transmission duration $\Delta t$ is. Therefore, the required number of multiple machines and phase accuracy of the system can be achieved by adjusting the number of bits of the synchronous phase information. If the number of bits is large, the synchronous phase accuracy is high, the number of multiple machines in the system is small; and if the number of bits is small, the synchronous phase accuracy is reduced, and the number of multiple machines in the system may be increased.

The method for multimachine phase synchronization based on optical fiber transmission disclosed by the present invention further includes a self-test mode and a self-calibration mode, where the self-test mode can detect whether the system meets the real-time synchronous phase transmission; and the self-calibration mode can simultaneously meet the real-time synchronous phase transmission and the minimum accuracy of the phase information set by the system so as to obtain an optimal number of bits of the synchronous phase information, such that the multimachine system achieves the synchronization function in real time and accurately.

Figure 5:
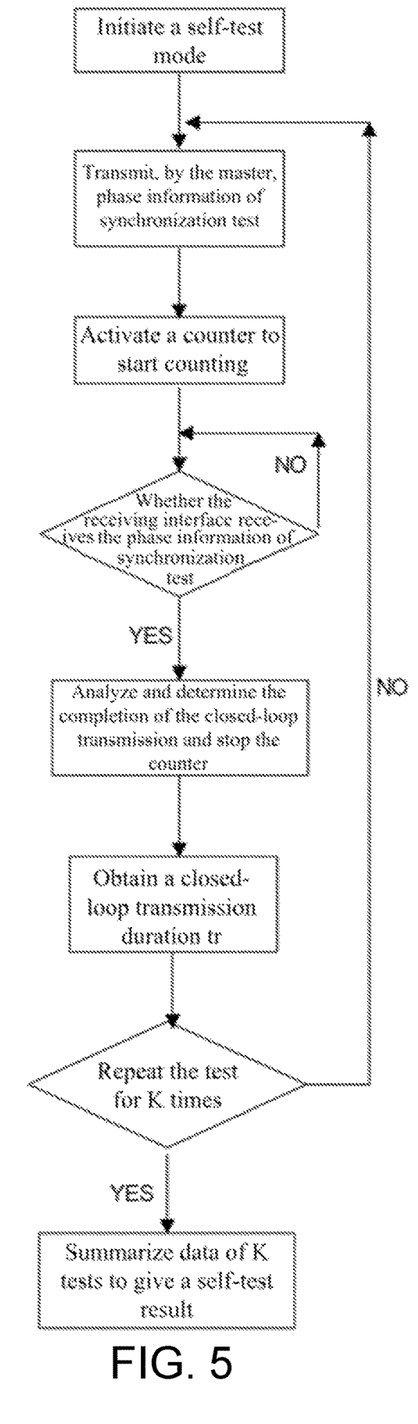
FIG. 5 is a flow chart of a self-test mode of the system according to the present invention.

As shown in FIG. 5, the last Slave N in the system is connected to Master 1 in an end-to-end manner to form a closed-loop communication test, and the self-test mode is initiated. Master 1 transmits phase information of synchronization test and meanwhile a counter is activated to start counting; when receiving the phase information of synchronization test transmitted from Slave N, Master 1 analyzes and determines the completion of the closed-loop transmission and the counter is stopped; a closed-loop transmission duration tr is obtained; the test is repeated for K times; and data of K tests is summarized to obtain a self-test result.

Master 1 transmits the phase information of synchronization test at an interval of time T, and if tr<T, the self-test determines that the real-time transmission is successful; similarly, if tr>T, the self-test determines that the real-time transmission fails.

Figure 6:
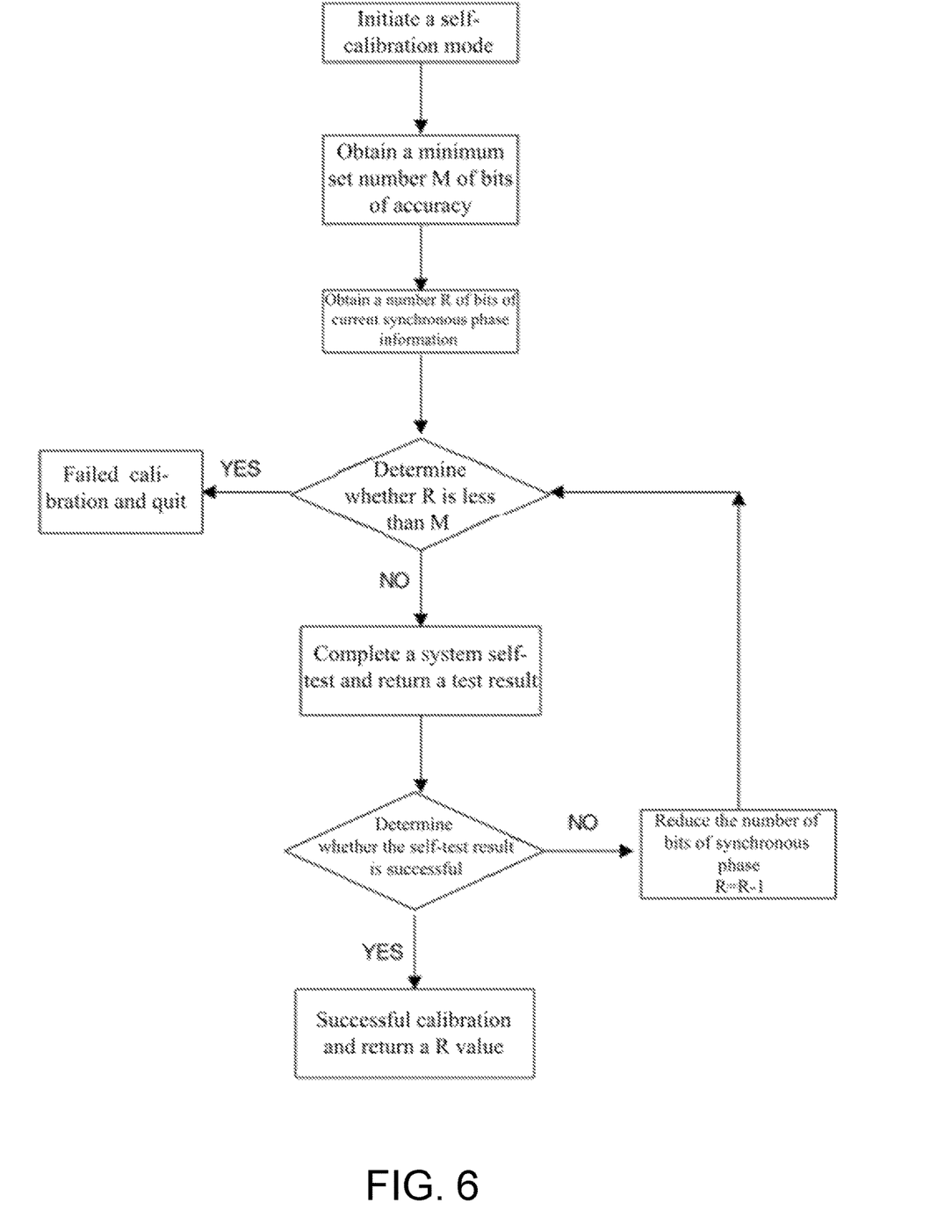
FIG. 6 is a flow chart of a self-calibration mode of the system according to the present invention.

When the self-test determines that the real-time transmission fails, the system enters the self-calibration mode. As shown in FIG. 6, the self-calibration mode is initiated; a user sets a minimum number of bits of the system synchronous phase information, a minimum set number M of bits of accuracy is obtained; a number R of bits of current system synchronous phase information is obtained; whether R is less than M is determined; if R<M, the self-calibration fails; if R>M, the self-test mode is initiated, a system self-test is completed, and a test result is returned; whether the self-test result is successful is determined; if so, the calibration is successful, and a R value is returned, where the R value is the optimal number of bits of the system synchronous phase information; if not, one synchronous phase bit is reduced (R=R−1); the process is repeated until the self-test is successful, the calibration is successful, and a R value is returned, where the R value is the optimal number of bits of the system synchronous phase information.

Although the embodiment of the present invention has been shown and described above, it is understood that the embodiment is exemplary and should not be construed as a limitation of the present invention, and changes, modifications, substitutions and variations to the embodiment can be made by those of ordinary skill in the art within the scope of the present invention.

What is claimed is:

1. A system for multimachine phase synchronization based on optical fiber transmission, comprising a master and a plurality of slaves, each of the master and the slaves being provided with an optical fiber transmitting interface and an optical fiber receiving interface, wherein the optical fiber transmitting interface of the master is connected to the optical fiber receiving interface of one slave by means of an optical fiber, the slave connected to the master is connected in series with the other slaves in turn, the optical fiber receiving interface of the slave is connected to the optical fiber transmitting interface of the previous slave connected thereto by means of an optical fiber, and the optical fiber transmitting interface of the slave is connected to the optical fiber receiving interface of the next slave connected thereto by means of an optical fiber; the master generates a new local digital reference source at an interval of time T, and transmits phase information of the local digital reference source thereof as a system synchronous phase signal to the slave connected to the master by means of an optical fiber, the optical fiber receiving interface of the slave receives the system synchronous phase signal, takes the received system synchronous phase signal as a phase of the local digital reference source, and transmits the system synchronous phase signal to the optical fiber receiving interface of a slave connected to the optical fiber transmitting interface of the slave through the optical fiber transmitting interface; and when the optical fiber transmitting interface of the last slave is connected to the optical fiber receiving interface of the master, the master and the slaves form a closed-loop communication test, and the closed-loop communication test comprises a self-test mode and a self-calibration mode.

2. The system for multimachine phase synchronization based on optical fiber transmission according to claim 1, wherein when generating the local digital reference source, the master encodes the phase information of the local digital reference source to generate a synchronous phase code value as the system synchronous phase signal.

3. The system for multimachine phase synchronization based on optical fiber transmission according to claim 1, wherein a duration of information transmission of the optical fiber is $T_{optical\ fiber}$, $T_{optical\ fiber} \ll T$, and T is a processing cycle of the local digital reference source of the master.

4. The system for multimachine phase synchronization based on optical fiber transmission according to claim 1, wherein when the system enters the self-test mode, if a time tr of receiving, by the master, the system synchronous phase signal returned by the last slave is less than T, a self-test determines that a real-time transmission is successful; and if tr is greater than T, the self-test determines that the real-time transmission fails, where T is a processing cycle of the local digital reference source of the master.

5. The system for multimachine phase synchronization based on optical fiber transmission according to claim 1, wherein when the system enters the self-calibration mode, the master acquires a set value of information bits of a current synchronous phase signal, and the system enters the self-test mode, when a self-test determines that a real-time transmission is successful, a self-calibration is completed, when the self-test determines that the real-time transmission fails, the information bits of the system synchronous phase signal is adjusted, and the self-calibration mode enters again until the self-test determines that the real-time transmission is successful.

6. The system for multimachine phase synchronization based on optical fiber transmission according to claim 5, wherein when the information bits of the system synchronous phase signal are a minimum accuracy, the self-calibration fails when the self-test determines that the real-time transmission has failed.

7. A method for multimachine phase synchronization based on optical fiber transmission, which is based on the system for multimachine phase synchronization based on optical fiber transmission according to claim 1, the method comprising the following steps:
  step 1: generating, by a master, a new local digital reference source at an interval of time T, and encoding phase information of the local digital reference source to generate a synchronous phase code value, namely, a system synchronous phase signal;
  step 2: transmitting, by the master, the system synchronous phase signal to an optical fiber receiving interface of a slave connected to the master through an optical fiber transmitting interface by means of an optical fiber;
  step 3: taking, by the slave connected to the master, the received system synchronous phase signal as a phase of the local digital reference source, and transmitting the system synchronous phase signal to an optical fiber receiving interface of a slave connected to the optical fiber transmitting interface of the slave by means of an optical fiber;
  step 4: taking, by the slave receiving the system synchronous phase signal from the optical fiber transmitting interface of the slave, the received system synchronous phase signal as a phase of the local digital reference source, and transmitting the system synchronous phase signal to an optical fiber receiving interface of a next slave connected to the optical fiber transmitting interface of the slave; and
  step 5: repeating step 4 until all the slaves receive the system synchronous phase signal and take the system synchronous phase signal as a phase of the local digital reference source, so as to achieve multimachine phase synchronization.

8. The method for multimachine phase synchronization based on optical fiber transmission according to claim 7, wherein a duration of information transmission of the optical fiber is $T_{optical\ fiber}$, $T_{optical\ fiber} \ll T$, and when there are N devices, the master transmits the system synchronous phase signal at time t1, the N-th slave receives the system synchronous phase signal at time tn, tn−t1<T, and when the N-th slave receives a first frame of the system synchronous phase signal of the master, a second frame of the system synchronous phase signal of the master has not been generated.

9. The method for multimachine phase synchronization based on optical fiber transmission according to claim 8, wherein a duration required for transmission of one frame of the system synchronous phase signal by the optical fiber is Δt, and when the N-th slave receives the first frame of the system synchronous phase signal of the master, N*Δt<T needs to be satisfied; at the same optical fiber rate, the larger the number of bits of the synchronous phase code value transmitted by the optical fiber is, the higher a phase accuracy is, and the longer a transmission duration Δt is; and when Δt becomes longer with the number of bits of the synchronous phase code value, N<T/Δt, the number N of the devices is smaller.

10. The method for multimachine phase synchronization based on optical fiber transmission according to claim 7, wherein when the master and the slaves form a closed-loop communication test, a self-test mode is entered first, and if a time tr of receiving, by the master, the system synchronous phase signal returned by the last slave is less than T, a self-test determines that a real-time transmission is successful, and if tr is greater than T, the self-test determines that the real-time transmission fails, and the system enters a self-calibration mode.

11. The method for multimachine phase synchronization based on optical fiber transmission according to claim 10, wherein when the system enters the self-calibration mode, the master acquires a set value of information bits of a current synchronous phase signal and a minimum set bits of accuracy, and the system enters the self-test mode, when the self-test determines that the real-time transmission is successful, a self-calibration is completed, when the self-test determines that the real-time transmission fails, the information bits of the system synchronous phase signal is adjusted, and the self-calibration mode enters again until the self-test determines that the real-time transmission is successful.

12. The method for multimachine phase synchronization based on optical fiber transmission according to claim 11, wherein when the information bits of the system synchronous phase signal are the minimum set bits of accuracy, the self-calibration fails when the self-test determines that the real-time transmission has failed.

* * * * *